United States Patent [19]

Hong

[11] Patent Number: 5,532,749
[45] Date of Patent: Jul. 2, 1996

[54] SAMPLE RATE CONVERSION DEVICE FOR PROCESSING NON-STANDARD TELEVISION SIGNAL

[75] Inventor: Sung H. Hong, Seoul, Rep. of Korea

[73] Assignee: Goldstar Co., Ltd., Seoul, Rep. of Korea

[21] Appl. No.: 318,159

[22] Filed: Oct. 5, 1994

[30] Foreign Application Priority Data

Oct. 5, 1993 [KR] Rep. of Korea .................. 20465/1993

[51] Int. Cl.$^6$ .................................................. H04N 7/01
[52] U.S. Cl. ........................................ 348/449; 348/441
[58] Field of Search ..................................... 348/441, 445, 348/449, 549, 194, 542, 544, 571, 572, 506, 714, 715, 718, 604; H04N 7/01

[56] References Cited

U.S. PATENT DOCUMENTS

| | | | |
|---|---|---|---|
| 4,101,939 | 7/1978 | Owen et al. | 348/537 |
| 4,635,100 | 1/1987 | Hirakawa | 348/506 |
| 4,665,437 | 5/1987 | Nicholson | 348/449 |
| 4,688,081 | 8/1987 | Furuhata et al. | 348/506 |
| 4,857,990 | 8/1989 | Horgan | 348/718 |
| 4,985,757 | 1/1991 | Yasuki et al. | 348/449 X |
| 5,268,750 | 12/1993 | Stec | 348/441 |
| 5,335,074 | 8/1994 | Stec | 348/441 |
| 5,359,366 | 10/1994 | Ubukata et al. | 348/537 X |
| 5,412,481 | 5/1995 | Ko et al. | 348/571 X |

OTHER PUBLICATIONS

Kurita et al; A Practical IDTV System Improving Picture Quality for Nonstandard TV Signals, IEEE Transactions on Consumer Electronics, vol. 34, No. 3, pp. 387–396, Aug. 1988.

Primary Examiner—Victor R. Kostak
Attorney, Agent, or Firm—Finnegan, Henderson, Farabow, Garrett & Dunner

[57] ABSTRACT

A sample rate conversion device for processing a non-standard television signal converts a sample rate of an output signal component of a color decoder that uses a BL (Burst Locked) clock, which is applied to a memory application part that uses a LL (Line Locked) clock, for a digital television system, such as an IDTV (Improved Definition Television) system, to prevent the degradation of picture quality which may develop when digital processing a non-standard TV signal. The conversion is done by repeating the signal component processed according to the BL clock every time the LL clock is ahead of the BL clock by one clock cycle in the situation when the LL clock is faster than the BL. When the LL clock is slower than the BL clock, the converter skips the signal component processed according to the BL clock every time the LL clock is behind the BL clock by one clock cycle.

10 Claims, 8 Drawing Sheets

| write address | read address | correction address | write address | read address | correction signal |
|---|---|---|---|---|---|
| 0 0 0 | 0 0 0 | 0 0 0 | 1 0 0 | 0 0 0 | 1 0 0 |
| 0 0 0 | 0 0 1 | 1 1 1 | 1 0 0 | 0 0 1 | 0 1 1 |
| 0 0 0 | 0 1 0 | 1 1 0 | 1 0 0 | 0 1 0 | 0 1 0 |
| 0 0 0 | 0 1 1 | 1 0 1 | 1 0 0 | 0 1 1 | 0 0 1 |
| 0 0 0 | 1 0 0 | 1 0 0 | 1 0 0 | 1 0 0 | 0 0 0 |
| 0 0 0 | 1 0 1 | 0 1 1 | 1 0 0 | 1 0 1 | 1 1 1 |
| 0 0 0 | 1 1 0 | 0 1 0 | 1 0 0 | 1 1 0 | 1 1 0 |
| 0 0 0 | 1 1 1 | 0 0 1 | 1 0 0 | 1 1 1 | 1 0 1 |
| 0 0 1 | 0 0 0 | 0 0 1 | 1 0 1 | 0 0 0 | 1 0 1 |
| 0 0 1 | 0 0 1 | 0 0 0 | 1 0 1 | 0 0 1 | 1 0 0 |
| 0 0 1 | 0 1 0 | 1 1 1 | 1 0 1 | 0 1 0 | 0 1 1 |
| 0 0 1 | 0 1 1 | 1 1 0 | 1 0 1 | 0 1 1 | 0 1 0 |
| 0 0 1 | 1 0 0 | 1 0 1 | 1 0 1 | 1 0 0 | 0 0 1 |
| 0 0 1 | 1 0 1 | 1 0 0 | 1 0 1 | 1 0 0 | 0 0 0 |
| 0 0 1 | 1 1 0 | 0 1 1 | 1 0 1 | 1 1 0 | 1 1 1 |
| 0 0 1 | 1 1 1 | 0 1 0 | 1 0 1 | 1 1 1 | 1 1 0 |
| 0 1 0 | 0 0 0 | 0 1 0 | 1 1 0 | 0 0 0 | 1 1 0 |
| 0 1 0 | 0 0 1 | 0 0 1 | 1 1 0 | 0 0 1 | 1 0 1 |
| 0 1 0 | 0 1 0 | 0 0 0 | 1 1 0 | 0 1 0 | 1 0 0 |
| 0 1 0 | 0 1 1 | 1 1 1 | 1 1 0 | 0 1 1 | 0 1 1 |
| 0 1 0 | 1 0 0 | 1 1 0 | 1 1 0 | 1 0 0 | 0 1 0 |
| 0 1 0 | 1 0 1 | 1 0 1 | 1 1 0 | 1 0 1 | 0 0 1 |
| 0 1 0 | 1 1 0 | 1 0 0 | 1 1 0 | 1 1 0 | 0 0 0 |
| 0 1 0 | 1 1 1 | 0 1 1 | 1 1 0 | 1 1 1 | 1 1 1 |
| 0 1 1 | 0 0 0 | 0 1 1 | 1 1 1 | 0 0 0 | 1 1 1 |
| 0 1 1 | 0 0 1 | 0 1 0 | 1 1 1 | 0 0 1 | 1 1 0 |
| 0 1 1 | 0 1 0 | 0 0 1 | 1 1 1 | 0 1 0 | 1 0 1 |
| 0 1 1 | 0 1 1 | 0 0 0 | 1 1 1 | 0 1 1 | 1 0 0 |
| 0 1 1 | 1 0 0 | 1 1 1 | 1 1 1 | 1 0 0 | 0 1 1 |
| 0 1 1 | 1 0 1 | 1 1 0 | 1 1 1 | 1 0 1 | 0 1 0 |
| 0 1 1 | 1 1 0 | 1 0 1 | 1 1 1 | 1 1 0 | 0 0 1 |
| 0 1 1 | 1 1 1 | 1 0 0 | 1 1 1 | 1 1 1 | 0 0 0 |

SAMPLE RATE CONVERSION DEVICE FOR PROCESSING NON-STANDARD TELEVISION SIGNAL

FIELD OF THE INVENTION

This invention relates to a sample rate conversion device for processing a non-standard television signal, which converts the sample rate of an output signal component of a color decoder that uses a BL (Burst Locked) clock, which is applied to a memory application part that uses an LL (Line Locked) clock; and more particularly to a sample rate conversion device for processing non-standard television signal, which can prevent picture quality degradation, during the digital processing of a non-standard television signal caused by skipping and repeatedly using the output signal component of the color decoder each time one clock difference occurs between the BL clock and the LL clock for a digital television (hereinafter called, 'TV') system such as an IDTV (Improved Definition Television) system.

BACKGROUND OF THE INVENTION

TV signals currently used widely can be classified into a standard TV signal having an exact format to the NTSC (National Television System Committee), and a non-standard TV signal, such as reproduction signal of a video cassette tape recorder. The standard TV signal has a frequency relation between horizontal synchronization signal and sub-carrier signal exactly meeting the following equation (I), whereas the non-standard TV signal may not.

$$f_{sc} = 455 f_H / 2 \qquad (I)$$

Wherein, the $f_{sc}$ is the frequency of a color sub-carrier signal of about 3.58 MHz and the $f_H$ is the frequency of a horizontal synchronization signal of 1570 Hz.

Therefore, a non-standard TV signal, which currently is used with an analog type TV system, does not exhibit a significant picture quality degradation. However, an IDTV system, with digital signal processing, can exhibit significant picture quality degradation depending on the clocks used, i.e., BL clock dedicated to a color burst signal, and LL clock dedicated to a horizontal synchronization signal.

The digital TV system has, for main signal processing parts, a luminance/color separator, color demodulator, and a line doubler. In case the BL clock is used for signal processing, a comparatively good result can be obtained from the luminance/color separator and the color demodulator, but a great picture quality degradation of screen flicker occurs for the non-standard TV signal processing of the line doubler. When the LL clock is used, a good result without screen flicker can be obtained from the processing of the line doubler. A great picture quality degradation in not being able to obtain a color signal, can occur for the non-standard TV signal processing of the luminance/color separator and the color demodulator.

Therefore, in an IDTV system, signal processing paths are changed according to the result of detection of standard and non-standard TV signals, BL clock is used for luminance/color separation and color demodulation, and, after the color demodulation, a sample rate of signals processed using LL clock as well as BL clock, i.e., luminance/color separated and color demodulated signals is converted suitable to LL clock and applied to a circuit part, using the LL clock.

The foregoing conventional art is explained hereinafter, referring to FIGS. 1–4(c).

Figure 1:
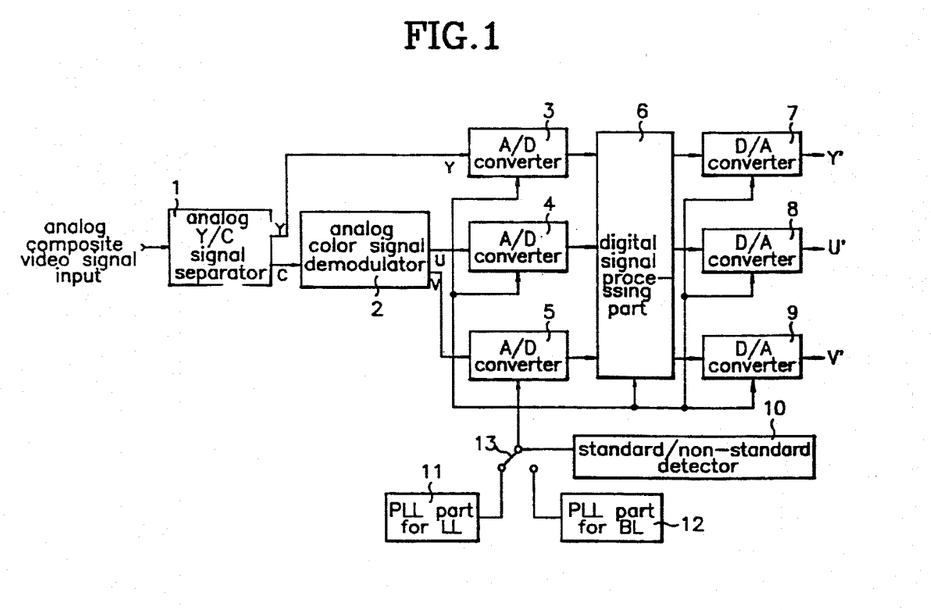
FIG. 1 is a schematic block diagram illustrating a conventional system for processing digital signals through detecting standard/non-standard TV signals.

As shown in FIG. 1, a conventional digital signal processing circuit for processing digital signal through detecting standard/non-standard TV signal includes a luminance/color separator 1 for separating luminance signal Y and color signal C from an analog composite video signal input. An analog color demodulator 2 for demodulating color difference signals U and V from the color signal C is connected to the luminance/color separator 1. Analog/digital converter 3 converts the luminance signal Y connected to the luminance/color separator 1 into a digital signal. The color difference signals U and V which are demodulated at the analog color demodulator 2 are converted into digital signals by analog/digital converters 4, 5. A digital signal processor 6 processes the signals received from the analog/digital converters 3, 4 and 5. Digital/analog converters 7, 8 and 9 convert the signals received from the digital signal processor 6 into an analog signal. A standard/non-standard detector 10 detects the received analog composite video signal of a standard TV signal and a non-standard TV signal. A PLL part 11 for LL, and a PLL 12 for BL, generates the LL clock and BL clock respectively. A change over switch 13 selects signals received from the PLL part 11 for LL, and the PLL part 12 for BL, and applies the selected signal to the analog/digital converters 3, 4 and 5, the digital signal processing part 6, and the digital/analog convertors 7, 8 and 9, as clock pulses on signals in response to the signal received from the standard/non-standard detector 10.

Operation of the foregoing conventional digital signal processing circuit through detecting standard/non-standard TV signal is explained hereinafter.

The composite video signal input is separated into luminance signal Y and color signal C at the luminance/color separator 1, and the separated color signal C is demodulated into color difference signals U and V at the analog color demodulator 2.

The separated luminance signal Y and the color difference signals U and V are converted into digital signals at the analog/digital converters 3, 4 and 5 respectively, processed by the digital signal processor part 6, and converted into analog signals at the digital/analog converter 7, 8, and 9, respectively.

The standard/non-standard detector 10 detects the received analog composite video signal of a standard TV signal and a non-standard TV signal and applies a control signal to the change over switch 13 according to the result of detection. The PLL part 11 for LL generates LL clock pulses dedicated to the horizontal synchronization signal, and the PLL part 12 for BL generates the BL clock pulses dedicated to color burst signals and applies the BL clock output or pulses to the change over switch 13. The change over switch 13 changes over in response to the signal received from the standard/non-standard detector 10 to select LL clock of the PLL part 11 for LL, or BL clock of the PLL part 12, for BL to apply to the analog/digital converters 3, 4 and 5, the digital signal processing part 6 and the digital/analog converters 7, 8 and 9, as clock, i.e., in case it is a standard TV signal, the BL clock is applied, and in case it is non- standard TV signal, the LL clock is applied.

However, the foregoing conventional art has problems in that the standard/non-standard detector 10 for detecting the standard/non-standard TV signal is difficult to manufacture because it is complicated, hard to integrate because it is processed in analog format up to the color demodulation, and is expensive because of the addition of the analog function and the conversion of the component signal into a digital signal.

Figure 2:
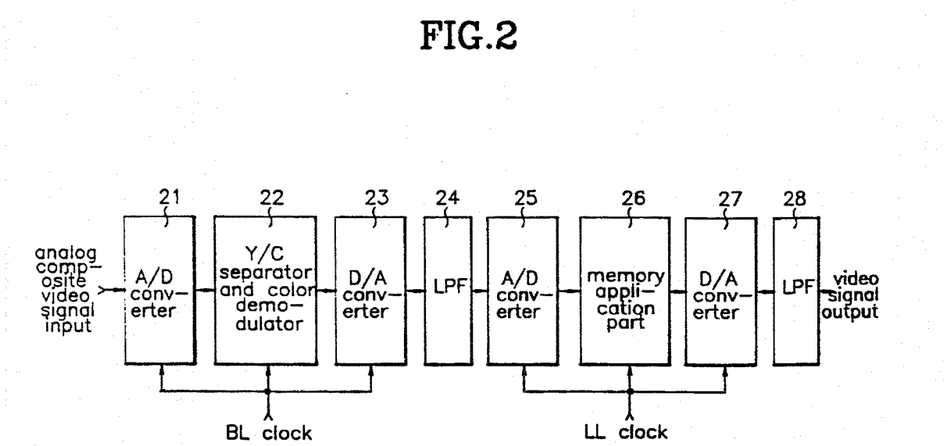
FIG. 2 is a schematic block diagram of a conventional analog sample rate conversion device.

As shown in FIG. 2, a conventional analog sample rate conversion device includes an analog/digital converter 21 for converting an analog composite video signal input into a digital signal according to the BL clock. A luminance/color separator and color demodulator 22 for luminance/color separating and color demodulating of the signal received from the analog/digital converter 21 according to BL clock is included. A digital/analog converter 23 is for converting the signal received from the luminance/color separator and color demodulator 22 into an analog signal according to the BL clock. A low pass filter 24 for low pass filtering of the signal received from the digital/analog converter 23, and an analog/digital converter 25 for converting the signal received from the low pass filter 24 a into digital signal according to LL clock is included. A memory application part 26 for carrying out the signal processing using memory, such as line doubling and ARC (Aspect Ratio Conversion) of the signal received from the analog/digital converter 25 according to LL clock, and a digital/analog converter 27 for converting the signal received from the memory application part 26 into analog signal according to LL clock, and a low pass filter 28 for low pass filtering of the signal received from the digital/analog converter 27 are also included.

Operation of the foregoing conventional analog sample rate conversion device is explained hereinafter.

The analog composite video signal is applied, under a condition that BL clock and LL clock are being applied thereto, is converted into a digital signal at the analog/digital converter 21 according to BL clock, and separated into luminance signal and color signal, as well as the separated color signal being demodulated into color difference signal at the luminance/color separator and color demodulator 22 according to the BL clock. The luminance signal and the color difference signal are converted into analog signals respectively at the digital/analog converter 23 according to the LL clock.

The analog luminance signal and color difference signal received from the digital/analog converter 23, are low pass filtered at the low pass filter 24, converted into digital signals at the analog/digital converter 25 according to the LL clock, line doubled and ARC processed at the memory application part 26 according to the LL clock, converted into analog signals at the digital/analog converter 27 according to the LL clock, and low pass filter at the low pass filter 28.

Although, the foregoing conventional sample rate conversion device does not develop any problems due to the difference of the BL clock and the LL clock for a non-standard TV signal because the digital luminance signal and color difference signal luminance/color separated and color demodulated according to BL clock are signal processed at the memory application part 26 after converted into analog signals, and converted again into digital signals according to LL clock, it has problems in that it inevitably develops picture quality degradation due to mixing with many noise signals in the process of converting the digital luminance signal and the color difference signal into analog signals, and then converting into digital signals again after the low pass filtering. It is expensive because many expensive analog/digital converters and digital/analog converters are used in the system.

Figure 3:
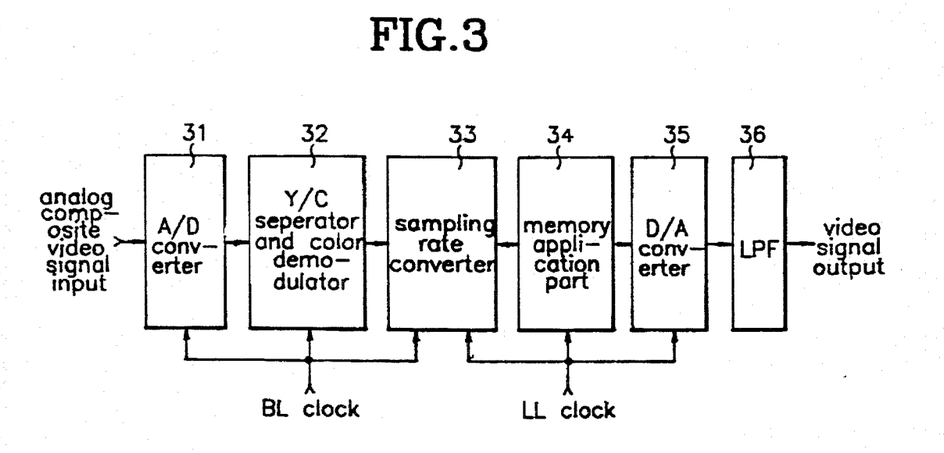
FIG. 3 is a schematic block diagram of a conventional digital sample rate conversion devices.

As shown in FIG. 3, a conventional digital sample rate conversion device includes an analog/digital converter 31 for converting an analog composite video signal input into a digital signal according to the BL clock; a luminance/color separator and color demodulator 32 for luminance/color separating and color demodulating of the signal received from the analog/digital converter 31 according to BL clock; a sample rate converter 33 for receiving the signals transmitted from the luminance/color separator and color demodulator 32 according to BL clock; and transmitting the signals synchronized to LL clock; a memory application part 34 for carrying out signal processing using memory, such as line doubling and ARC (Aspect Ratio Conversion) of the signal received from the sample rate converter 33 according to LL clock; a digital/analog converter 35 for converting the signal received from the memory application part 34 into an analog signal according to LL clock; and a low pass filter 36 for low pass filtering of the signal received from the digital/analog converter 35.

Operation of the foregoing conventional digital sample rate conversion device is explained hereinafter.

An analog composite video signal applied under the condition that the BL clock and LL clock are being applied, is converted into a digital signal at the analog/digital converter 31 according to BL clock, and separated into a luminance signal and color signal. The separated color signal is demodulated into a color difference signal at the luminance/color separator and a color demodulator 32 according to BL clock.

The luminance signal and color signal received from the luminance/color separator and color demodulator 32, are applied to the sample rate converter 33, transmitted therefrom in synchronization with LL clock, line doubled and ARC processed at the memory application part 34 according to the LL clock, converted into analog signals at the digital/analog converter 35, and low pass filtered at the low pass filter 36.

Figure 4A:
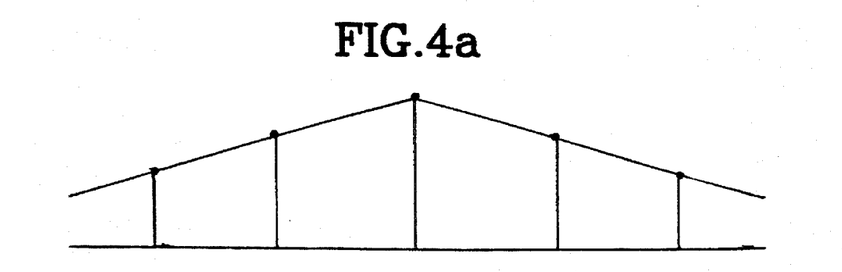
FIGS. 4(a)–4(c) are graphical illustrations of the sample rate conversion device of FIG. 3.
Figure 4B:
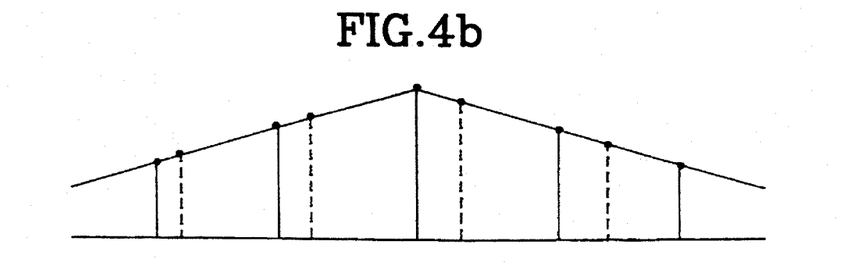
Figure 4C:
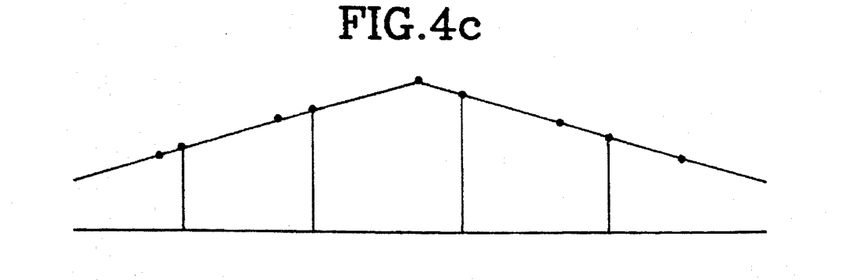

The Operational principle of the digital sample rate converter 33 based on interpolation method for the conventional digital sample rate conversion device is explained with references to FIGS. 4(a)–4(c).

The sampling component shown in FIGS. 4(a) and 4(b) in solid lines is the signal component applied to the sample rate converter 33 from the luminance/color separator and color demodulator 32, i.e., the signal component digitally processed by the BL clock.

The sampling component shown in FIG. 4(b) in dotted lines is the signal component transmitted from the sample rate converter 33 according to LL clock.

As shown in FIG. 4(c) the sample rate can be converted by an interpolation filter (not shown) having a variable filter coefficient obtained from the phase information on the BL clock and LL clock through the process of converting the signal component synchronized with the BL clock to synchronize with the LL clock at the sample rate converter 33.

However, the conventional digital sample rate converter has a problem in that the calculation of the exact variable filter coefficient is not possible because the required exactness of the phase comparison of the BL clock and the LL clock for calculating the variable filter coefficient of the interpolation filter should be carried out at a frequency more than 1000 times higher than the frequency of LL clock. For example, in case the frequency of LL clock is 910 $f_H$(~14.37 MHz), it should be carried out at a very high frequency of about 14.3 GHz for calculating an exact variable filter coefficient.

SUMMARY OF THE INVENTION

The object of this invention, which is devised for solving the foregoing various conventional problems is to provide a sample rate conversion device which can easily prevent picture quality degradation in processing non-standard TV signal. In case the LL clock is faster than the BL clock at a comparison of BL clock and LL clock, repeating the signal component processed according to the BL clock each time the LL clock is ahead than BL clock by one clock, and, in case LL clock is slower than BL clock, skipping the signal component processed according to BL clock every time LL clock is slower than BL clock by one clock, utilizing the principle that, in case a non-standard TV signal has a BL clock of 4 fsc and an LL clock of 910 $f_H$, a maximum difference of 3 clocks occurs in one horizontal period, wherein, due to close relationship of video signals in horizontal direction, even though these video signals are replaced with next pixel components, the naked eyes of regular watcher can not distinguish it.

These and other objects and features of this invention can be achieved by providing a sample rate conversion device for processing a non-standard television signal including a write address counting means reset to a horizontal synchronization signal for counting BL (Burst Locked) clock for n bits repeatedly, to generate it as a write address, a read address counting means reset to a horizontal synchronization signal for counting LL (Line Locked) clock for n bits repeatedly to generate it as a read address, a read address correction signal generation means, for comparing signals received from the write address counting means and the read address counting means and generates a correction signal according to the difference at the correction means, an adder for adding the correction signal of the read address correction means to the signal received from the read address counting means to generate a corrected read address, and a buffer memory for storing digital data applied thereto in response to the signal received from the write address counting means, and reading and transmitting the stored digital data in response to the signal received from the adder.

DETAILED DESCRIPTION OF THE PREFERRED EMBODIMENTS

Figure 5:
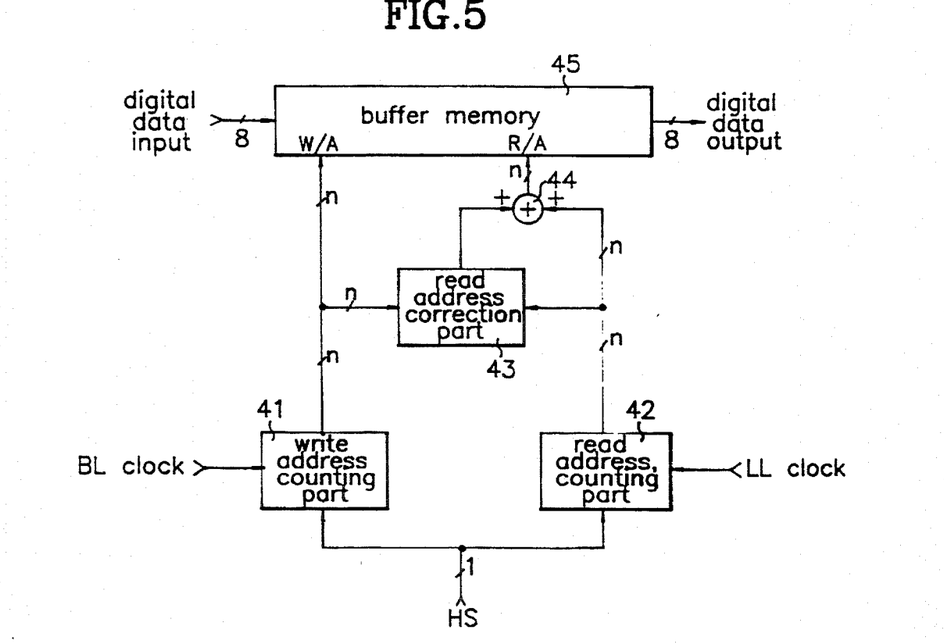
FIG. 5 is a schematic block diagram showing the overall system of a sample rate conversion device in accordance with the present invention.

As shown in FIG. 5, a sample rate conversion device in accordance with the invention includes a write address counting part 41, a read address counting part 42, a read address correction part 43, an adder 44 and a buffer memory 45.

The write address counting part 41, being reset according to a horizontal synchronization signal, counts BL clock for n (herein, n=1, 2, . . . ,) bits and generates it as a write address, and the read address counting part 42, which is reset according to the horizontal synchronization signal, counts LL clock for n (herein, n=1, 2, . . . ,) bits and generates it as a read address.

The read address correction signal generation part 43 compares the write address and the read address received from the write address counting part 41 and the read address counting part 42 and generates a correction signal according to the difference in the comparison.

The adder 44 adds the correction signal received from the read address correction part 43 to the read address received from the read address counting part 12 to generate a corrected read address.

The buffer memory 45 stores the digital data applied thereto according to the write address received from the write address counting part 41, and reads in and transmits the stored digital data according to the corrected read address received from the adder 44.

Operation of the foregoing sample rate conversion device in accordance with this invention is explained hereinafter. In this connection, whenever the term "clock" is used herein, it shall mean a source of accurately timed pulses and also the output, such as pulses, or signals of such sources.

The write address counting part 41 and the read address counting part 42, which are reset by the horizontal synchronization signal HS applied thereto at every horizontal line, count the BL clock and the LL clock, respectively, applied thereto for n bits repeatedly, and generate them as a write address and a read address.

The generated write address is applied to the buffer memory 45 as well as to the read address correction signal generation part 43 together with the read address received from the read address counting part 42, for the read address correction signal generation part 43 to compare them and to transmit a correction signal according to the difference.

The correction signal received from the read address correction part 43 is applied to the adder 44 to add to the read address received from the read address counting part 42 to generate it as a read address.

The buffer memory 45 stores the applied digital data, i.e., the digital luminance signal and the color difference signal according to the write address received from the write address counting part 41, reads in the stored digital data according to the corrected read address received from the read address correction signal generation part 43, and converts the sample rate of the read in data, i.e., the digital signal processed with the BL clock being synchronized to the LL clock, to apply to the memory application part.

Figure 6:
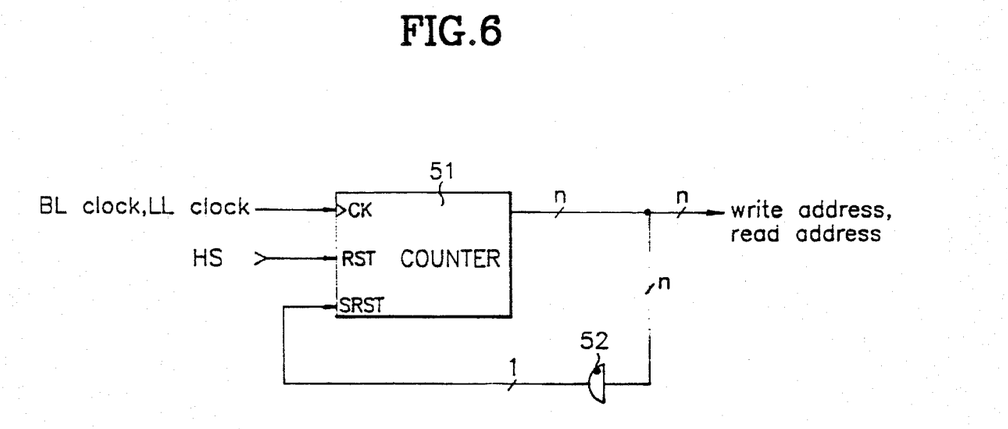
FIG. 6 is a detail diagram of the write and read clock signal counter of FIG. 5.

As shown in FIG. 6, the write address counting part 41 and the read address counting part 42 each includes a counter 51, which is reset according to the horizontal synchronization signal HS, for counting BL clock and LL clock to generate a write address and a read address respectively, and an AND gate 52 for detecting the completion of counting of the counter 51 to reset the counter 51.

The write address counting part 41 includes a counter 51, being reset according to the horizontal synchronization signal HS, for counting BL clock to generate a write address, and an AND gate 52 for detecting the completion of counting of the counter 51 to reset the counter 51.

The read address counting part 42 also includes a counter 51, which is reset according to the horizontal synchronization signal HS, for counting LL clock to generate a read address, and an AND gate 52 for detecting the completion of counting of the counter 51 to reset the counter 51.

Operation of the write address counting part 41 and the read address counting part 42 is explained hereinafter.

The horizontal synchronization signal HS applied to the reset RST terminal of the counter 51 at every horizontal line, resets the counter 51; and the counter 51, being reset, counts the BL clock and the LL clock applied to the clock terminal CK in bits to generate a write address and a read address.

Upon completion of counting by the counter 51, the AND gate 52 applies a high voltage to a synchronization reset terminal SRST of the counter 51 to reset the counter 51 again to count the BL clock and the LL clock to generate again a write address and a read address.

The counter 51, which is reset according to the horizontal synchronization signal HS, counts the BL clock and the LL clock repeatedly according to the signal received from the AND gate 52 and generates a write address and a read address.

Figure 7:
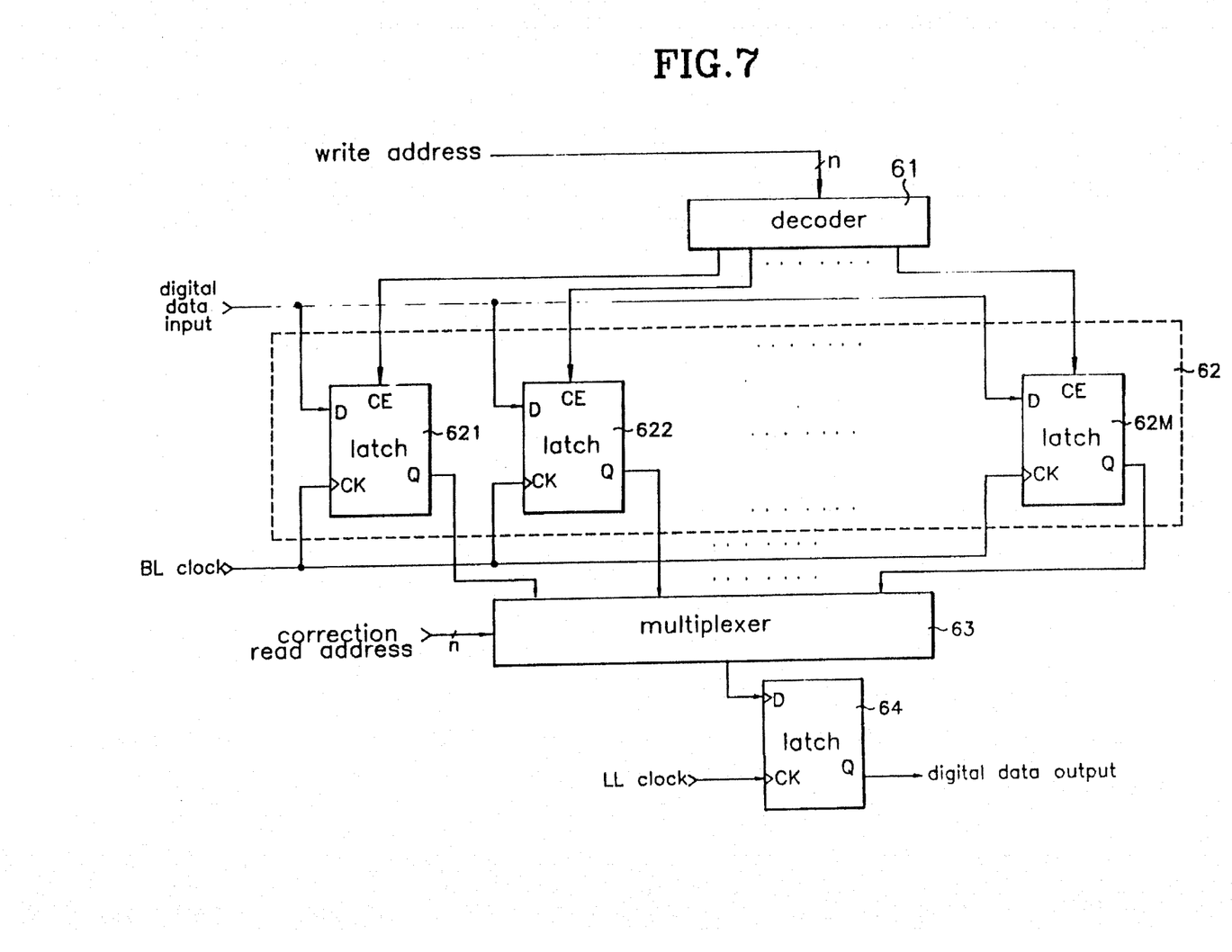
FIG. 7 is a diagram of the buffer memory of FIG. 5 in more detail.

As shown in FIG. 7, the buffer memory 45 includes a decoder 61 for decoding an n bit write address received from the write address counting part 41 and applying a clock enable signal to one of output terminal of the $2^n$ output terminals, 2" latches 621, 622, ..., 62M selectively coming into clock enable condition according to the signal received from the decoder 61 for storing and transmitting digital data, a multiplexer 63 for selecting and transmitting one of the signals received from the latches 621, 622, ..., 62M according to the n bit corrected read address received from the adder 44, and a latch 64 for storing and transmitting the signal received from the multiplexer 63 according to the LL clock.

Operation of the foregoing buffer memory 45 is explained hereinafter.

The n bit write address received from the write address counting part 41 is, decoded at the decoder 61 to transmit a high voltage clock enable signal through one output terminal corresponding to the decoded value. For example, in case the write address is of 3 bits of '010', the high voltage clock enable signal is transmitted through the third output terminal.

Since the clock enable signal received from the decoder 61 is applied to the clock enable terminal CE of the latches 621, 622, ..., 62M each having a data input terminal D for applying the digital data thereto and a clock terminal CK for applying the BL clock thereto, the latches 621, 622, ..., 62M, selectively coming into a clock enable condition according to the signal of the decoder, can store the digital data and transmit the stored digital data through output terminals Q according to the BL clock.

Herein, since the write address is counting the BL clock, increased successively, the latches 621, 622, ..., 62M, coming into a clock enable condition successively, store and transmit the digital data, successively.

The digital data transmitted from the latches 621, 622, ..., 62M to the multiplexer 63 is selectively transmitted according to the corrected read address.

That is, the digital data transmitted from the latches 621, 622, ..., 62M to the multiplexer 63 has the sample rate converted, which is transmitted through the latch 64 according to the LL clock.

Figure 8A:
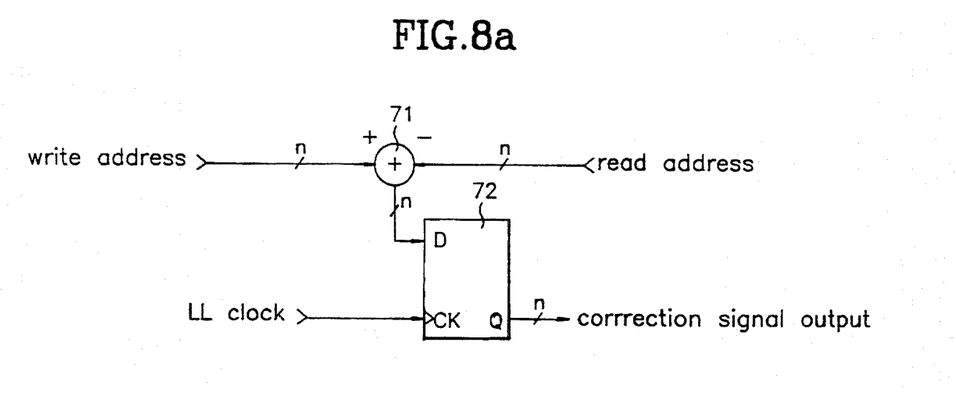
FIG. 8(a) is a diagram of one embodiment of the read address correction of FIG. 5 in more detail in accordance with the present invention.

Shown in FIG. 8(a) is one embodiment of the read address correction signal generation part 43 including a subtracter 71 for subtracting the read address, received from the read address counting part 42, from the write address received from the write address counting part 41, and a latch 72 for transmitting the signal received from the subtracter 71 as a correction signal according to the LL clock.

The one embodiment of read address correction part 43 having the foregoing system is explained, with reference to FIGS. 9(a)–9(e) and 10(a)–10(e).

The subtracter 71 subtracts the read address received from the read address counting part 42 in n bits at counting LL clock, from the write address received from the write address counting part 41 in bits at counting BL clock, and the signal received from the subtracter 71 is transmitted through the latch 72 according to the LL clock.

Figure 9A:
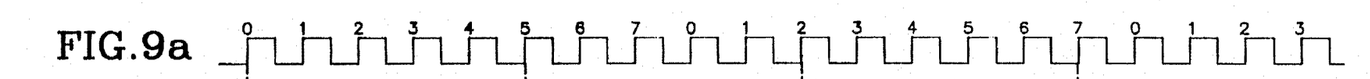
FIGS. 9(a)–9(e) and 10(a)–10(e) are wave forms of various components of FIGS. 7 and 8(a)
Figure 9B:
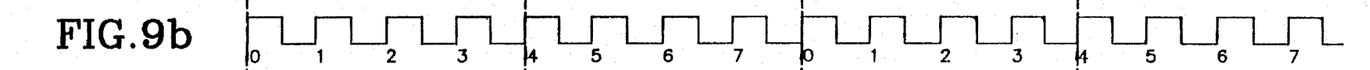

For example, assume that BL clock is applied as shown in FIG. 9(a), LL clock is applied at a lower frequency than the BL clock as shown in FIG. 9(b), and the write and read addresses are of 3 bits, is explained hereinafter.

Figure 9C:
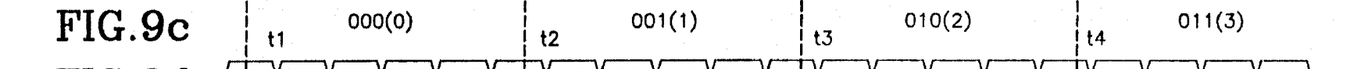
Figure 9D:
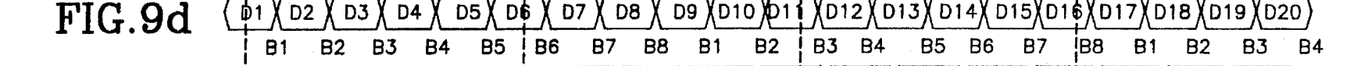

Of the signal received from the subtracter 71, excluding the carry signal, the correction signal passing through the latch 72 according to the LL clock is as shown in FIG. 9(c), and this correction address, after being added to the read address at the adder 44 and applied to the multiplexer 63 of the buffer memory 45 as a read address, is applied as shown in FIG. 9(d) according to the BL clock.

Figure 9E:
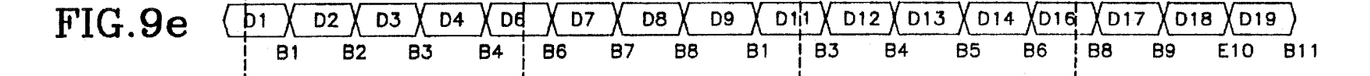

The digital data stored and transmitted in the latches 621, 622, ..., 62M of the buffer memory 45 is transmitted from the multiplexer 63 as shown in FIG. 9(e) according to the corrected read address. That is, as shown in FIG. 9(e), every time t2, t3, t4, ... BL clock is ahead of LL clock by one clock, the digital data D5, D10, D15, ... is skipped.

Figure 10A:
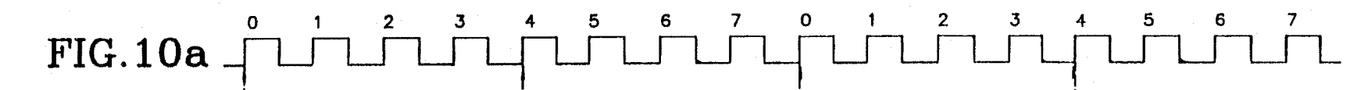
Figure 10B:
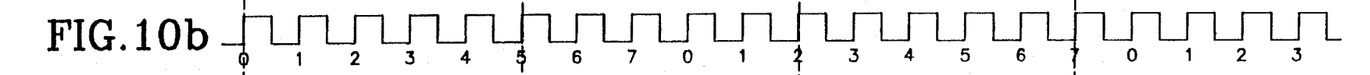

For example, assume that the BL clock is applied as shown in FIG. 10(a), the LL clock is applied at a higher frequency than the BL clock as shown in FIG. 10(b), and the write and read addresses are 3 bits, is explained hereinafter.

Figure 10C:
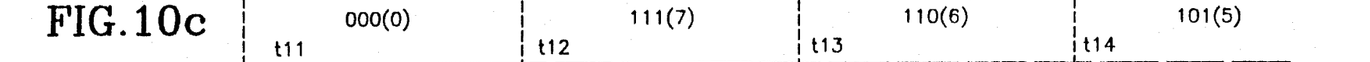
Figure 10D:
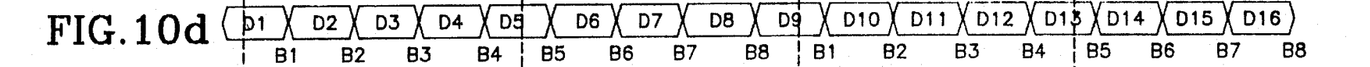

The correction signal transmitted from the subtracter 71 and passing through the latch 72 according to the LL clock is as shown in FIG. 10(c); and this correction signal, after being added to the read address at the adder 44 and applied to the multiplexer 63 of the buffer memory 45 as a corrected read address, is applied as shown in FIG. 10(d) according to the BL clock.

Figure 10E:
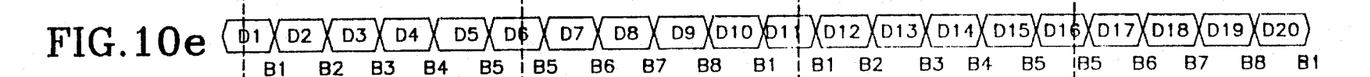

The digital data stored and transmitted in the latches 621, 622, ..., 62M of the buffer memory 45 is transmitted from the multiplexer 63 as shown in FIG. 10(e) according to the corrected read address. That is, as shown in FIG. 10(e), every time t12, t13, t14, ... BL clock is ahead of LL clock by one clock, the digital data D5, D10, D15, ... is transmitted, repeatedly.

Figure 8B:
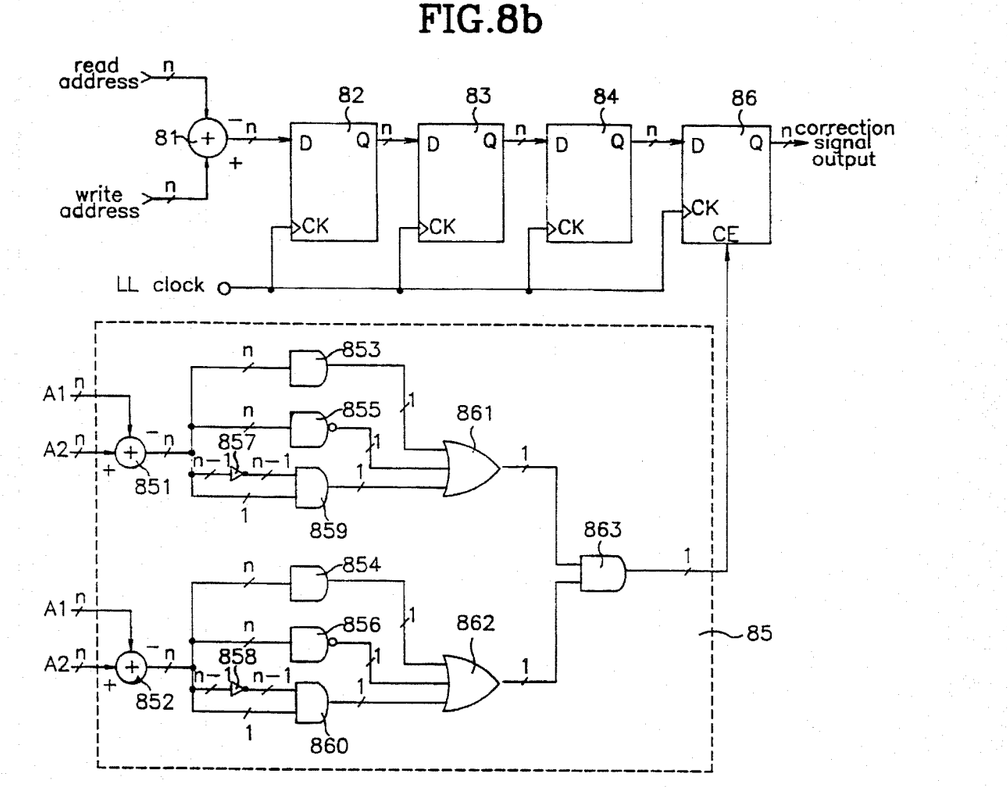
FIG. 8(b) is a diagram of a second embodiment of the read address correction part of FIG. 5 in accordance with the present invention.

Shown in FIG. 8(b) is a second embodiment of the read address correction part 43 including a subtracter 81 for subtracting the read address received from the read address, counting part 42, from the write address received from the write address counting part 41, and three latches 82, 83 and 84 connected in series for delaying and transmitting the signal received from the subtracter 81 successively according to the LL clock. A timing error determination part 85 is for determining the development of a timing error by comparing the signal received from the two forward latches 82 and 83, and a latch 86 clock which is enabled in case the timing error determination part 85 has determined the development of no error, for transmitting the signal received from the last latch 84 as a correction signal according to the LL clock.

The timing error determination part 85 includes subtracters 851 and 852 for calculating differences of signals received from the two latches 83 and 84 respectively, AND gates 853 and 854 for determining the signal received from the subtracter 851 and 852 to be '$2^n-1$' respectively, NAND gates 855 and 856 for determining the signal received from the subtracters 851 and 852 to be '0' respectively, inverters 857, 858 and AND gates 859, 860 for determining the signal received from the subtracters 851 and 852 to be '1' respectively, OR gates 861 and 862 for logical summing of the signals received from the AND gates 853, 859 and 854, 860 and the NAND gates 855 and 856 respectively, and an AND gate 863 for determining development of timing error by logical multiplying of the signals received from the OR gates 861 and 862.

The second embodiment of the read address correction part 43 with the foregoing system is provided for controlling the timing error that can be developed in the one embodiment of the read address correction part 43 shown in FIG. 8(a).

Operation of the second embodiment of the read address correction signal generation part 43 with the foregoing system is to be explained hereinafter.

The subtracter 81 subtracts the read address applied thereto according to BL clock, from the write address applied thereto according to BL clock; and the signal output of the subtracter 81 is delayed and transmitted through the latches 82, 83 and 84 successively according to the LL clock.

When it is assumed that the output signals of the latches 82 and 83 are A1 and A2 respectively, in case timing error does not develop, since the signal values subtracting carry bits from the difference of A1 and A2 will be '0', '1' and $2^n-1$, i.e., if the write and read address are of three bits, the signal values will be '000', '001' and '111' only, upon calculation of the difference of A1 and A2 at the subtracters 851 and 852 of the error determination part 85, if the signal output of the subtracters 851 and 852 are '$2^n-1$', the AND gates 853 and 854 transmit high voltages, in case they are '0', the NAND gates 855 and 856 transmit high voltages, and in case they are '1', the inverters 857, 858 and AND gates 859, 860 transmit high voltages. Therefore, in case no timing error has been developed, since all of the OR gates 861 and 862 as well as the AND gate 869, transmit high voltages to put latch 86 in a clock enable condition, the latch 86 transmits the signal output of the latch 84 as a correction signal according to the LL clock.

In case a timing error develops, since the AND gate 863 transmits a low voltage, the latch 86 can not come into a clock enable condition, due to this, the latch 86 continues to transmit the previous correction signal stored when the timing error was not developed.

Accordingly, the second embodiment of the read address correction part 43 shown in FIG. 8(b) can eliminate the timing error that can be developed in the one embodiment of the read address correction part 43 shown in FIG. 8(a).

Figure 8C:
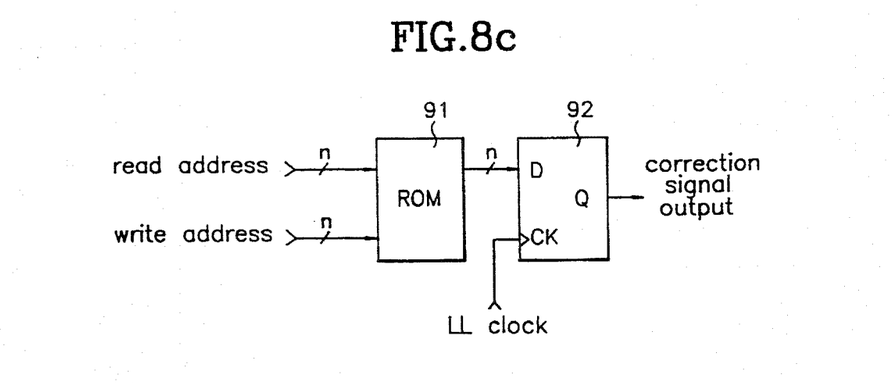
FIG. 8(c) is a diagram of a third embodiment of the read address correction part of FIG. 5 in accordance with the present invention.

As shown in FIG. 8(c), a third embodiment of the read address correction part 43 includes a ROM 91 for storing correction signals in advance, and transmitting corresponding correction signals according to read and write address signals, and a latch 92 for synchronizing the signal received from the R0M 91 to the LL clock and for transmitting the synchronized signal.

Operation of the third embodiment of the read address correction part 43 with the foregoing system is explained with reference to FIG. 11.

Of the correction signals stored in the ROM 91 in advance according to the write address of the write address counting part 41, and the read address of the read address counting part 42, a corresponding address is transmitted, which transmitted correction signal is, synchronized to the LL clock, and transmitted through the latch 93.

Figure 11:
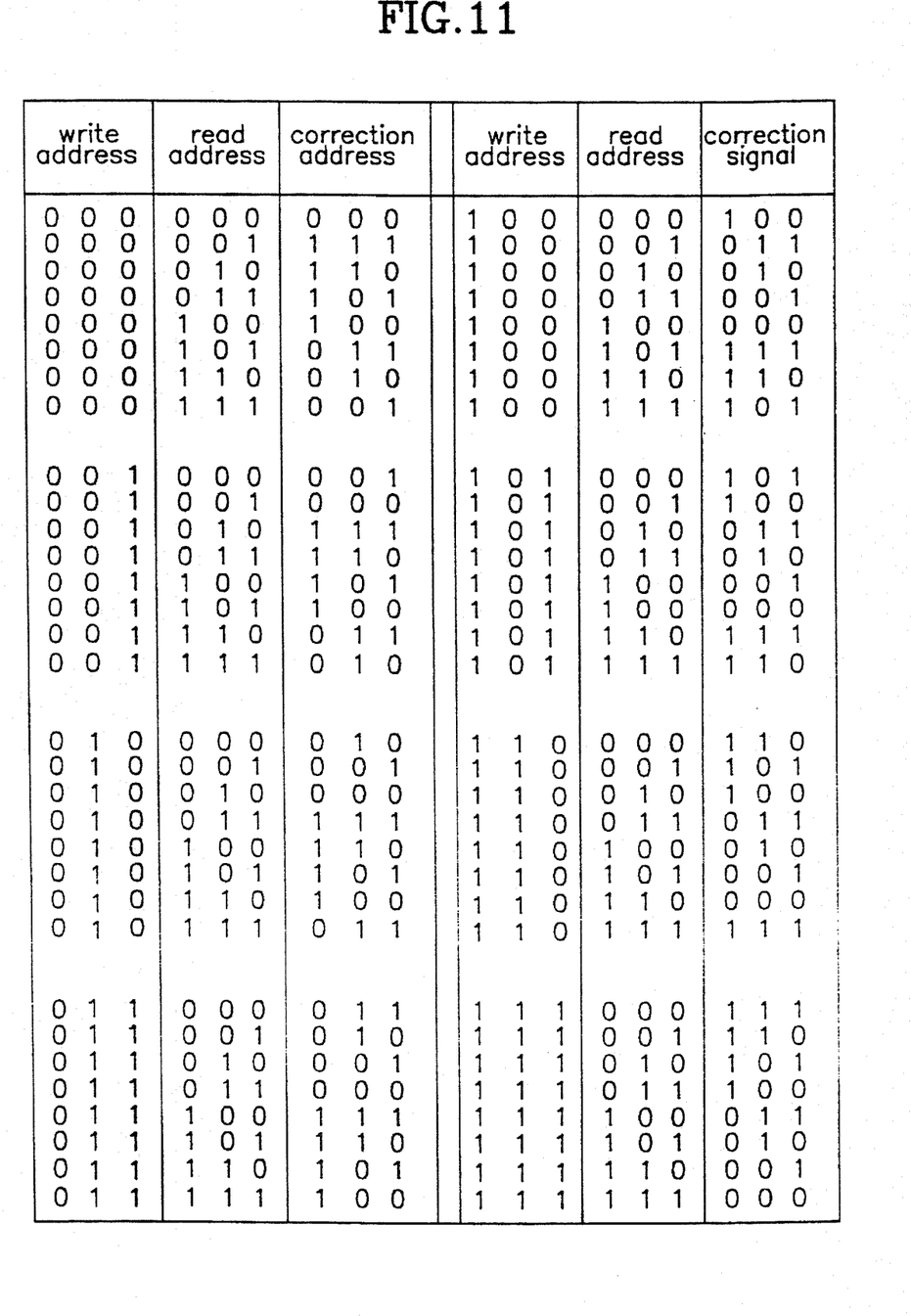
FIG. 11 is a table showing an example of data stored in the ROM of FIGS. 8(a) and a(d).

For example, assume that the write and read address are of three bits, the correction signals stored in the ROM 91 will be as shown in FIG. 11.

Figure 8D:
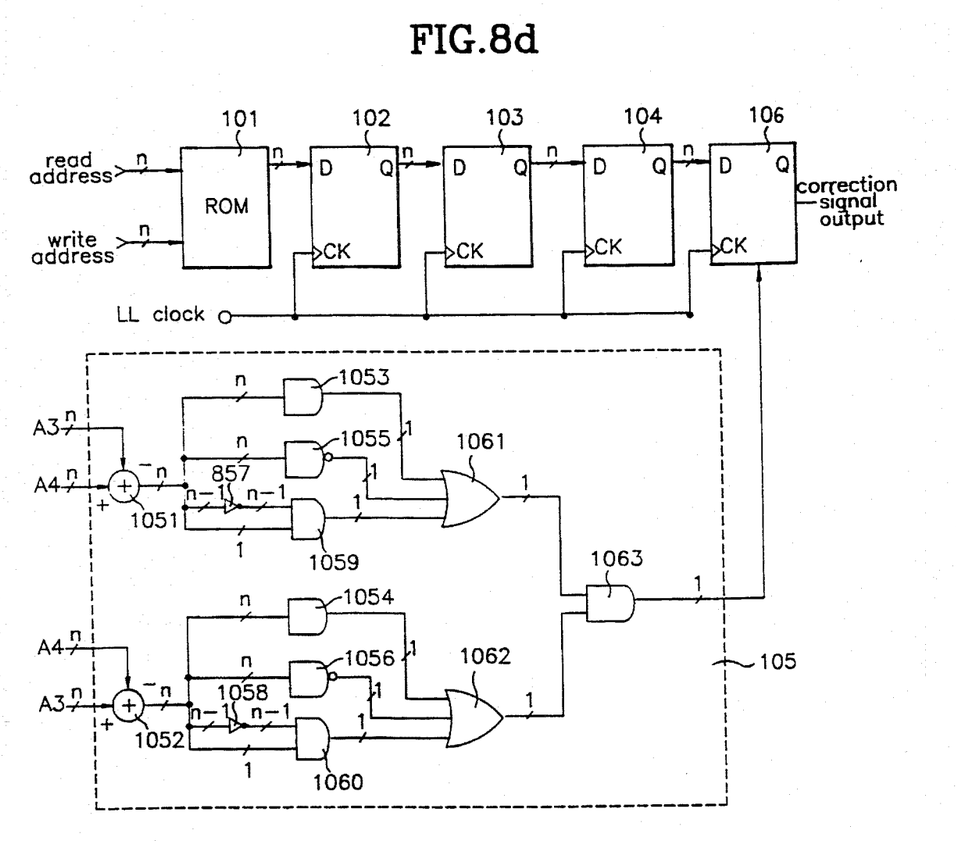
FIG. 8(d) is a diagram of a fifth embodiment of the read address correction part of FIG. 5 in accordance with the present invention.

As shown in FIG. 8(d), a fourth embodiment of the read address correction part 43 includes a ROM 101 for storing correction signals in advance and transmitting corresponding correction signal according to read and write address signals, three latches 102, 103 and 104 connected in series for delaying and transmitting the signal received from the ROM 101 successively according to the LL clock, a timing error determination part 105 for determining development of a timing error by comparing the signal received from the two forward latches 102 and 103, and a latch 106 clock enabled in case the timing error determination part 85 has determined no error has developed and synchronized to LL clock, for transmitting the signal received from the last latch 104 as a correction signal.

The timing error determination part 105 includes subtracters 1051 and 1052 for calculating differences of signals received from the latches 102 and 103 respectively AND gates 1053 and 1054 for determining the signal received from the subtracter 1051 and 1052 to be '$2^n-1$' respectively, NAND gates 1055 and 1056 for determining the signal received from the subtracters 1051 and 1052 to be '0' respectively, inverters 1057 and 1058, and AND gates 1059 and 1060 for determining the signal received from the subtracters 1051 and 1052 to be '1' respectively, OR gates 1061 and 1062 for logical summing of the signals received from the AND gates 1053, 1059 and 1054, 1060 and the NAND gates 1055 and 1056 respectively, and an AND gate 1063 for determining development of timing error by the logical multiplication of the signals received from the OR gates 1061 and 1062.

The fourth embodiment of the read address correction part 43 with the foregoing system is provided for controlling the timing error that may develop in the third embodiment of the read address correction signal generation part 43 shown in FIG. 8(c).

Operation of the fourth embodiment of the read address correction signal generation part 43 with the foregoing system is to be explained hereinafter.

Of the correction signals stored in the ROM 101 according to write address and read address, corresponding correction signals are transmitted. The transmitted correction signals are transmitted through the latches 102, 103 and 104 successively according to the LL clock. Under such a condition, the timing error determination part 105 is operated similarly with the timing error determination part 85 shown in FIG. 8(c) in response to the signal received from the latches 102 and 103 to determine development of timing error. In case no timing error develops, the latch 106 transmits the signal received from the latch 104 according to the LL clock, and in case error has developed, the correction signal for the case of no error development, continues to transmit.

When it is assumed that the output signals of the latches 102 and 103 are A3 and A4 respectively, in case timing error does not develop, and since the signal values subtracting carry bits from the difference of A3 and A4 will be '0', '1' and $2^n-1$, i.e., if the write and read addresses are of three bits, the signal values will be '000', '001' and '111' only, upon calculating the difference of A3 and A4 at the subtracters 1051 and 1052 of the error determination part 105, if the signal output of the subtracters 1051 and 1052 are '$2^n-1$', the AND gates 1053 and 1054 transmit high voltages, in case they are '0', the NAND gates 1055 and 1056 transmit high voltages, and in case they are '1', the inverters 1057 and 1058, and AND gates 1059 and 1060 transmit high voltages.

Therefore, in case a timing error has not developed, since all of the OR gates 1061 and 1062, as well as the AND gate 1063, transmit high voltages to make the latch 106 to be in a clock enable condition, the latch 106 transmits the signal output of the latch 104 as a correction signal according to the LL clock.

In case a timing error develops, since the AND gate 1063 transmits a low voltage, the latch 106 can not come into a clock enable condition; and due to this, the latch 106 continues to transmit the previous correction signal which was stored when the timing error was not developed.

As has been explained in detail, this invention can prevent degradation of picture quality when processing non-standard TV signals caused by skipping and repeatedly transmitting digital data every time BL clock and LL clock have a difference by one clock.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope to the appended claims.

What is claimed is:

1. A sample rate conversion device for processing a non-standard television signal comprising:

a write address counting means reset to a horizontal synchronization signal for counting a BL (Burst Locked) clock for n bits repeatedly to generate a write address signal;

a read address counting means reset to a horizontal synchronization signal for counting a LL (Line Locked) clock for n bits repeatedly to generate a read address signal;

a read address correction signal generation means for comparing the write address signal received from the write address counting means and the read address signal received from the read address counting means and generating a correction signal according to a difference of the comparison;

an adder for adding the correction signal from the read address correction signal generation means to the signal received from the read address counting means to generate a corrected read address signal; and a buffer memory for storing digital data applied thereto in response to the write address signal received from the write address counting means, and reading in and transmitting the stored digital data in response to the corrected read address signal received from the adder.

2. The sample rate conversion device for processing a non-standard television signal as claimed in claim 1, wherein the write address counting means includes:

a counter, reset according to the horizontal synchronization signal, for counting the BL clock to generate the write address signal, and an AND gate for resetting the counter in response to detection of a completion of counting by the counter.

3. The sample rate conversion device for processing a non-standard television signal as claimed in claim 1, wherein the read address counting means includes:

a counter, reset according to the horizontal synchronization signal, for counting the LL clock to generate the read address signal, and an AND gate for resetting the counter in response to a detection of a completion of counting of the counter.

4. The sample rate conversion device for processing a non-standard television signal as claimed in claim 1, wherein the buffer memory includes:

a decoder for decoding an n bit write address received from the write address counting means and applying a clock enable signal to one output terminal of $2^n$ output terminals, $2^n$ latches selectively latched to a clock enable condition according to the signal received from the decoder for storing and transmitting digital data, a multiplexer for selecting and transmitting one of plural signals received from the latches according to the corrected read address signal received from the adder, and a latch for storing and transmitting the signal received from the multiplexer according to the LL clock.

5. The sample rate conversion device for processing a non-standard television signal as claimed in claim 1, wherein the read address correction signal generation means includes a subtracter for subtracting the read address received from the read address counting means from the write address received from the write address counting means, and a latch for transmitting the signal received from the subtracter as a correction signal according to the LL clock.

6. The sample rate conversion device for processing a non-standard television signal as claimed in claim 1, wherein the read address correction signal generation means includes:

a subtracter for subtracting the read address signal received from the read address counting means from the write address signal received from the write address counting means, first, second and third latches connected in series for delaying and transmitting a signal received from the subtracter successively according to the LL clock, a timing error determination means for determining development of a timing error by comparing the signal received from the first and the second latches, and a fourth latch clock enabled in case the timing error determination means has determined no timing error development, for transmitting the signal received from the third latch as a correction signal according to the LL clock.

7. The sample rate conversion device for processing a non-standard television signal as claimed in claim 6, wherein the timing error determination means includes:

first and second subtracters for calculating differences between the signals received from the first and the second latches, first and second AND gates for determining signals received from the first and second subtracters to be $2^n-1$, first and second NAND gates for determining the signal received from the first and the second subtracters to be '0', first and second inverters and third and fourth AND gates for determining the signals received from the first and the second subtracters to be '1' respectively, first and second OR gates for logical summing signals received from the first, the second, the third and the fourth AND gates and the first and the second NAND gates, and a fifth AND gate for determining development of the timing error by logical multiplying of signals received from the first and the second OR gates.

8. The sample rate conversion device for processing a non-standard television signal as claimed in claim 1, wherein the read address correction signal generation means includes:

a ROM for storing correction signals in advance and transmitting corresponding correction signals according to the read and the write address signals received from the write address counting means and the read address counting means, respectively, and a latch for synchronizing a signal received from the ROM to the LL clock and transmitting the synchronized signal.

9. The sample rate conversion device for processing a non-standard television signal as claimed in claim 1, wherein the read address correction signal generation means includes:

a ROM for storing correction signals in advance and transmitting corresponding correction signal according to the read and write address signals, first, second and third latches connected in series for delaying and transmitting a signal received from the ROM successively according to the LL clock, a timing error determination means for determining development of a timing error by comparing signals received from the first and the second latches, and a fourth latch clock enabled and synchronized to the LL clock for transmitting a signal received from the third latch as a correction signal when the timing error determination means has determined no timing error development.

10. The sample rate conversion device for processing a non-standard television signal as claimed in claim 9, wherein the timing error determination means includes:

a first subtracter and a second subtracter for calculating differences between the signals received from the first and the second latches, first and second AND gates for determining signals received from the first and second subtracters to be $2^n-1$, first and second NAND gates for determining the signals received from the first and the second subtracters to be '0', first and second inverters and third and fourth AND gates for determining the signals received from the first and the second subtracters to be '1', first and second OR gates for logical summing signals received from the first, the second, the third and the fourth AND gates and the first and the second NAND gates, and a fifth AND gate for determining development of the timing error by logical multiplying signals received from the first and the second OR gates.

* * * * *